E. THOMAS.
SPRING SUSPENSION MECHANISM.
APPLICATION FILED APR. 23, 1917.
1,242,495.
Patented Oct. 9, 1917.
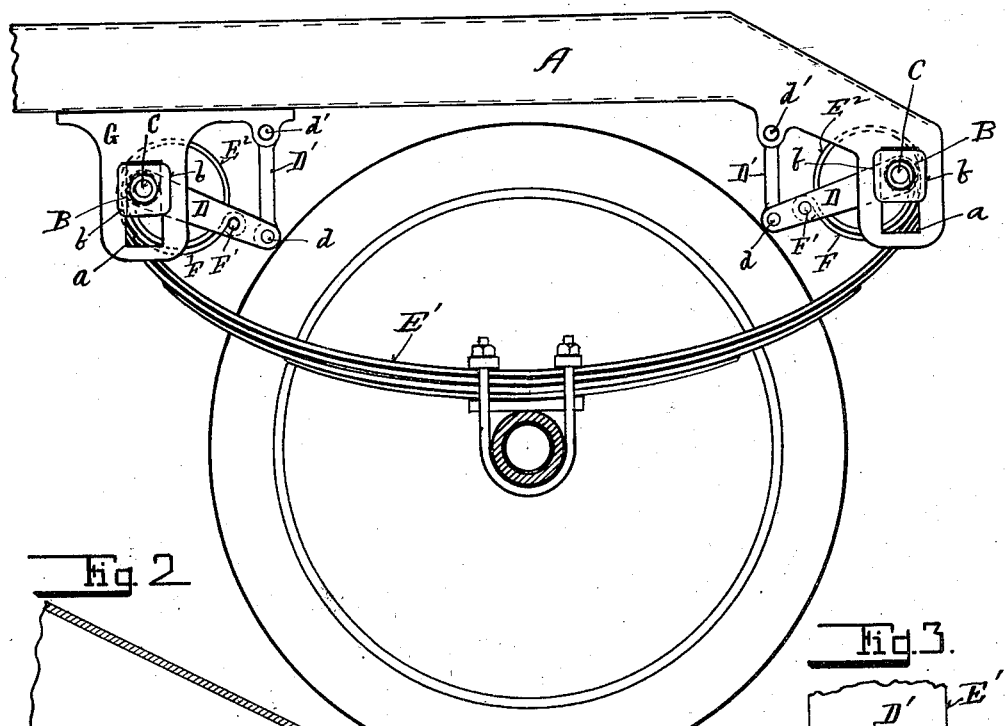
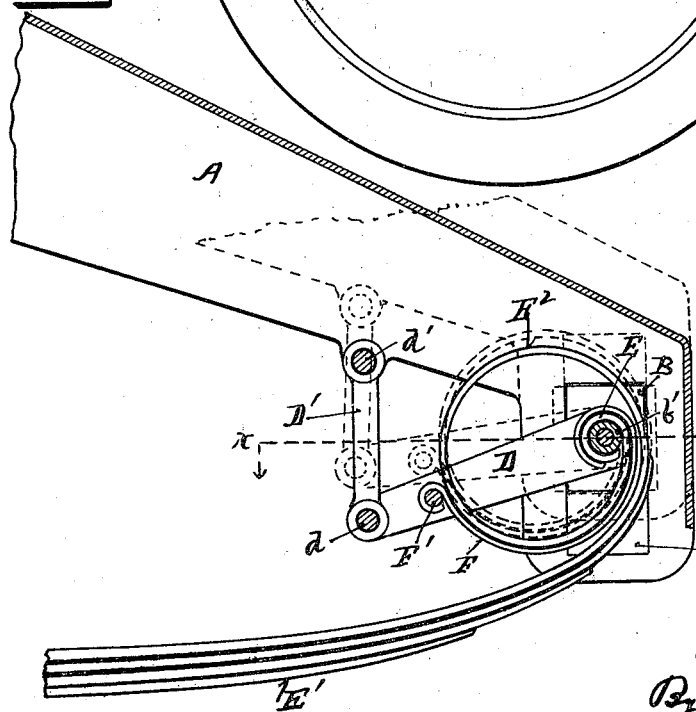
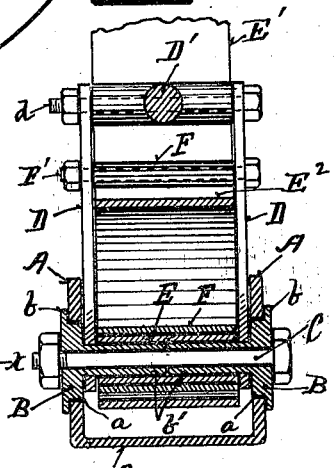
Inventor.
Edward Thomas

UNITED STATES PATENT OFFICE.

EDMUND THOMAS, OF ERIE, PENNSYLVANIA.

SPRING SUSPENSION MECHANISM.

1,242,495.　　　　　Specification of Letters Patent.　　Patented Oct. 9, 1917.

Application filed April 23, 1917. Serial No. 163,937.

*To all whom it may concern:*

Be it known that I, EDMUND THOMAS, a citizen of the United States, residing at Erie, in the county of Erie and State of Pennsylvania, have invented certain new and useful Improvements in Spring Suspension Mechanism; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to spring-suspension mechanism for vehicles and has for its object to provide means whereby the rebound of the vehicle body will be actively resisted by the vehicle springs.

The features of my invention are hereinafter fully explained and pointed out and are illustrated in the accompanying drawings in which:

Figure 1, is a side view in elevation of a portion of a vehicle chassis showing my invention embodied therein.

Fig. 2, is an enlarged view of a fragment thereof.

Fig. 3, is a section thereof on the line $x$—$x$ in Fig. 2.

In these drawings A indicates the side bar of a vehicle chassis, the end of which is U-shaped, inverted, as is indicated in the drawings, and the side walls thereof are provided with vertical slots $a$, $a$ in which are placed slidable plates B, B which are provided with lips $b$ $b$, which over-lap the sides of the side-bar A at each side of the slot $a$; said slidable plates B are also provided with inwardly extending sleeves $b'$, through which a bolt C passes, and by means of which the plates B B can be drawn inward until said sleeves $b'$ meet each other; said sleeves being of such length that the lips $b$ $b$ on the plates B B will just meet the sides of the side-bar without pressing thereagainst.

Upon the sleeves $b'$ immediately inside of the sides of the side-bar A, I mount levers D D, and between the free ends of said levers D D there is pivoted a link D' by means of a bolt $d$ the upper end of said link being pivoted to the side-bar A by means of a bolt $d'$. Upon the sleeves $b'$, between the levers D D the terminal eye E of a vehicle spring E' is placed; said vehicle spring being provided with a spiral coil $E^2$ which terminates in the eye E. Upon the terminal eye E of the spring E', I hook one end of a strap F, the other end of said strap passing under the spiral coil $E^2$ and being secured upon a bolt F' secured in the levers D. The opposite end of the vehicle spring E' is formed the same as hereinbefore described, and is mounted upon slides B as described, which are slidably mounted in slots $a$ $a$ in a bifurcated bracket G secured to the side-bar A, and is provided with levers D D, strap F and link D' as above described.

In operation when the chassis rebounds above the normal retraction of the spring E', the slides B B move to the bottom of the slots $a$ $a$ and the levers D D are drawn upward by the links D', which tends to unwind the spiral coils $E^2$ at the ends of the spring E', as shown by broken lines in Fig. 2, which thereby tends to resist said upward movement of the side-bar A of the chassis.

Having thus shown and described my invention so as to enable others to utilize the same, what I claim as new and desire to secure by Letters Patent is:—

1. In an apparatus of the class described, a chassis side-bar, a vehicle spring, a spiral coil on the end of said spring, means to secure the end of said spiral coil to said side-bar, and lever mechanism adapted to be actuated by said side-bar to cause said spiral coil to partially unwind when said side-bar rebounds beyond the normal retraction of said vehicle spring, substantially as set forth.

2. In an apparatus of the class described, a vehicle spring, a spirally curved end thereon terminating in a bolt receiving eye eccentric to said spiral curve, a bolt in said eye, a chassis side-bar having slots therethrough to receive said bolt passing through the eye in the end of said spiral curve, and mechanism adapted to cause said spiral curve to partially unwind when said bolt moves downward in said slots, substantially as set forth.

3. In an apparatus of the class described, a vehicle spring terminating in a spiral coil, a chassis side-bar having a vertical slot therein, a bolt passing through said slot and the end of said coil to secure the vehicle spring and side-bar together, lever mechanism fulcrumed on said bolt, a link pivoted to the free end of said lever mechanism and to said side-bar, and a strap under said spiral coil and supported on said lever mechanism and its fulcrum, whereby said coil will be partially unwound when said side-bar rebounds beyond the normal retraction of said vehicle spring, substantially as set forth.

4. In an apparatus of the class described, a chassis side-bar, a vehicle spring, a spiral coil on said spring, a bolt to secure the end of said spring to said side-bar, a strap under said coil and supported on said bolt, and mechanism to cause the free end of said strap to move in unison with said side-bar, substantially as set forth.

5. In an apparatus of the class described, a chassis side-bar, vertical slots therein, slidable plates in said slots, inwardly projecting sleeves on said plates, a bolt passing through said sleeves to hold said plates in said slots, levers fulcrumed on said sleeves, a vehicle spring, a spiral coil on the end of said spring and secured upon said sleeves between said levers, a strap hooked over the end of said coil and passing under said coil and having its free end secured to said levers, and a link pivoted to the free ends of said levers and to said side-bar, substantially as set forth.

In testimony whereof I affix my signature.

EDMUND THOMAS.

Copies of this patent may be obtained for five cents each, by addressing the "Commissioner of Patents, Washington, D. C."